United States Patent
Sano

(10) Patent No.: US 12,135,232 B2
(45) Date of Patent: Nov. 5, 2024

(54) REMAINING MOBILE PHASE SCALE

(71) Applicant: SHIMADZU CORPORATION, Kyoto (JP)

(72) Inventor: Toshiki Sano, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 542 days.

(21) Appl. No.: 17/630,547

(22) PCT Filed: Aug. 19, 2019

(86) PCT No.: PCT/JP2019/032282
§ 371 (c)(1),
(2) Date: Jan. 27, 2022

(87) PCT Pub. No.: WO2021/033235
PCT Pub. Date: Feb. 25, 2021

(65) Prior Publication Data
US 2022/0244091 A1    Aug. 4, 2022

(51) Int. Cl.
*G01G 17/04*    (2006.01)
*G01G 23/00*    (2006.01)
(52) U.S. Cl.
CPC ............. *G01G 17/04* (2013.01); *G01G 23/00* (2013.01)
(58) Field of Classification Search
CPC ..... G01G 17/04; G01G 23/00; G01N 30/8804
See application file for complete search history.

(56) References Cited

U.S. PATENT DOCUMENTS

| | | | | |
|---|---|---|---|---|
| 4,690,230 | A | * 9/1987 | Uchimura | G01G 19/42 177/229 |
| 2019/0104864 | A1 | * 4/2019 | Barnet | A47B 96/021 |
| 2019/0257731 | A1 | * 8/2019 | Isoi | G01G 19/414 |
| 2020/0056606 | A1 | * 2/2020 | Yokoi | F04B 49/106 |

FOREIGN PATENT DOCUMENTS

| | | | | |
|---|---|---|---|---|
| DE | 102023102587 A1 | * 3/2023 | | G01N 30/88 |
| WO | 2018/211584 A1 | 11/2018 | | |
| WO | WO-2020183564 A1 | * 9/2020 | | |

OTHER PUBLICATIONS

International Search Report for corresponding Application No. PCT/JP2019/032282, mailed Sep. 10, 2019.
Written Opinion for corresponding Application No. PCT/JP2019/032282, mailed Sep. 10, 2019 (English machine translation).

* cited by examiner

*Primary Examiner* — Natalie Huls
(74) *Attorney, Agent, or Firm* — Renner, Otto, Boisselle & Sklar, LLP

(57) ABSTRACT

A remaining mobile phase scale includes a weighing scale (2) including a plurality of individual stages (10A, 10B) on which mobile phase bottles containing a mobile phase are placed and a plurality of individual weight sensors (12A, 12B) that respectively measure weight of mobile phase bottles respectively placed on the plurality of individual stages (10A, 10B), a detachment-attachment holder (4) detachably and attachably placed on the plurality of individual stages (10A, 10B) such that the plurality of individual stages (10A, 10B) are integrated as one common stage, and a mobile phase monitor (6) that monitors a remaining amount of a mobile phase in mobile phase bottles, and the mobile phase monitor (6) is provided with a mode switcher (28) configured to selectively switch a mobile phase monitor mode to one of a normal mode and a large capacity mode.

10 Claims, 3 Drawing Sheets

REMAINING MOBILE PHASE SCALE

TECHNICAL FIELD

The present invention relates to a remaining mobile phase scale for monitoring a remaining amount of a mobile phase to be used in an analysis device such as a liquid chromatograph.

BACKGROUND ART

In a liquid chromatograph, a remaining amount of a mobile phase is monitored in real time, and an analysis in progress may be stopped when the remaining amount of the mobile phase is insufficient in order to prevent failure of an analysis and deterioration of consumables caused by depletion of the mobile phase. A remaining amount of a mobile phase can be monitored by periodic measurement of the weight of a mobile phase bottle by a weight sensor, for example (see Patent Document 1).

CITATION LIST

Patent Document

[Patent Document 1] WO 2018/211584 A1

SUMMARY OF INVENTION

Technical Problem

Mobile phase bottles used in a liquid chromatograph come in a variety of capacities. Further, weight sensors come in a variety of measurement weight ranges (weight ranges suited for measurement). A weight sensor having a large measurement weight range has high load-resistant performance and is suitable for measurement of the weight of a large capacity mobile phase bottle. However, its measurement sensitivity may be insufficient for measurement of the weight of a small capacity mobile phase bottle, and a result of measurement may be inaccurate. On the other hand, a weight sensor having a small measurement weight range can accurately measure the weight of a small capacity mobile phase bottle. However, its load-resistant performance may be insufficient for measurement of the weight of a large capacity mobile phase bottle, and the weight sensor may fail.

Therefore, it is necessary to prepare a plurality of types of weight sensors having different measurement weight ranges in order to accurately measure the weight of mobile phase bottles having various capacities and accurately monitor a remaining amount of a mobile phase. However, preparing a plurality of types of weight sensors increases the device cost. Further, in a case where only a mobile phase bottle having a specific capacity is used, an unnecessary weight sensor is present and wasteful.

The present invention was conceived considering the above-mentioned problems, and an object of the present invention is to enable accurate monitoring of a remaining amount of a mobile phase contained in mobile phase bottles having various capacities.

Solution to Problem

A remaining mobile phase scale according to the present invention includes a weighing scale including a plurality of individual stages on which mobile phase bottles containing a mobile phase are placed and a plurality of individual weight sensors that respectively measure weight of mobile phase bottles respectively placed on the plurality of individual stages, and a mobile phase monitor that monitors a remaining amount of a mobile phase in mobile phase bottles based on measurement values of the plurality of individual weight sensors of the weighing scale, and the mobile phase monitor includes a mode switcher configured to selectively switch a mobile phase monitor mode to one of a normal mode and a large capacity mode, a first calculator configured to obtain a remaining amount of a mobile phase in mobile phase bottles respectively placed on the plurality of individual stages with use of respective measurement values of the plurality of individual weight sensors of the weighing scale, when the monitor mode is in the normal mode, and a second calculator configured to use the plurality of individual stages as the one common stage and obtain a remaining amount of a mobile phase in a mobile phase bottle placed on the common stage with use of a total value of measurement values of the plurality of individual weight sensors of the weighing scale, when the monitor mode is in the large capacity mode.

Advantageous Effects of Invention

A remaining mobile phase scale according to the present invention includes a detachment-attachment holder detachably and attachably placed on the plurality of individual weight sensors of a weighing scale, and a mode switcher configured to selectively switch a mobile phase monitor mode to one of a normal mode and a large capacity mode, wherein the detachment-attachment holder is placed on the plurality of individual stages, and the remaining mobile phase scale is configured to use the plurality of individual stages as one common stage, and obtain a remaining amount of a mobile phase in a mobile phase bottle placed on the common stage with use of an operation value of measurement values of the plurality of individual weight sensors of the weighing scale, when the monitor mode is switched to the large capacity mode. Even in a case where load-resistance performance of one individual weight sensor is insufficient for a large capacity mobile phase bottle, when the detachment-attachment holder is placed on the plurality of individual stages, and the plurality of individual stages are used as the one common stage, a load applied to each individual load sensor is reduced, and the plurality of individual weight sensors can be used as one weight sensor suitable for the large capacity mobile phase bottle. In this manner, it is possible to accurately monitor a remaining amount of a mobile phase in mobile phase bottles having various capacities by placing the detachment-attachment holder on the plurality of individual stages as necessary.

DESCRIPTION OF EMBODIMENTS

One inventive example of a remaining mobile phase scale according to the present invention will be described below with reference to the drawings.

Figure 1:
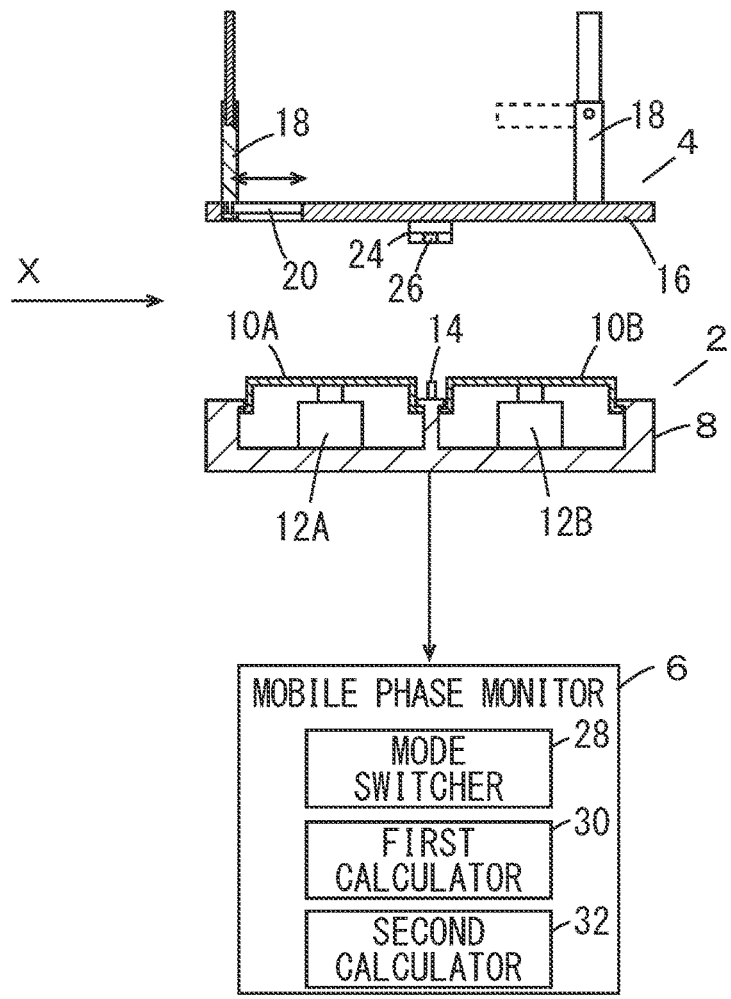
FIG. 1 A schematic cross sectional view showing the configuration of one inventive example of a remaining mobile phase scale.

As shown in FIG. 1, the remaining mobile phase scale includes a weighing scale 2, a detachment-attachment holder 4 and a mobile phase monitor 6. The weighing scale 2 is to measure the weight of a mobile phase bottle containing a mobile phase to be used for an analysis in a liquid chromatograph or the like. The detachment-attachment holder 4 is attachably and detachably attached to the weighing scale 2 as necessary. The mobile phase monitor 6 is connected to be communicable with the weighing scale 2 and has a function of monitoring a remaining amount of a mobile phase based on the weight of a mobile phase bottle measured by the weighing scale 2.

The weighing scale 2 of this inventive example includes a casing 8, individual stages 10A, 10B and individual weight sensors 12A, 12B. The individual weight sensors 12A and 12B are contained in the casing 8. Mobile phase bottles are to be respectively placed on the upper surfaces of the individual stages 10A and 10B, and the individual stages 10A and 10B are respectively arranged above the individual weight sensors 12A and 12B. The individual weight sensors 12A and 12B respectively support the individual stages 10A and 10B from below and measure the weight of the mobile phase bottles placed on the upper surfaces of the individual stages 10A and 10B. In this inventive example, the individual weight sensors 12A and 12B have the same load-resistant performance.

The individual stages 10A and 10B are provided to be adjacent to each other. The upper surfaces of the individual stages 10A and 10B are horizontal planes and project farther upwardly than the upper surface of the casing 8. The upper surfaces of the individual stages 10A and 10B are located at the same height with mobile phase bottles not placed.

Projections 14 extending upwardly are provided at a plurality of locations (only one location is shown in the diagram) on the upper surface of the casing 8 of the weighing scale 2. The projections 14 are to be engaged with engaging portions 24 of the detachment-attachment holder 4 when the detachment-attachment holder 4 is attached to the weighing scale 2 to prevent a positional shift of the detachment-attachment holder 4.

The detachment-attachment holder 4 is placed on the individual stages 10A and 10B of the weighing scale 2 for use of the two individual stages 10A and 10B as one common stage. The detachment-attachment holder 4 includes a base 16 and a plurality of arms 18. The base 16 is a flat plate-shaped member having an upper surface and a bottom surface larger than the individual stages 10A and 10B. The plurality of arms 18 are attached to peripheral portions of the base 16 to extend upwardly from the upper surface of the base 16. The plurality of arms 18 hold mobile phase bottles by surrounding the mobile phase bottles placed on the upper surface of the base 16 so as to prevent the mobile phase bottles from falling from the base 16.

Long holes 20 extending in radial directions of the bottom surfaces of the mobile phase bottles placed on the base 16 are respectively provided in the attachment portions for the arms 18 of the base 16, and the arms 18 are slidable along the long holes 20 provided in the base 16. That is, the distances between the plurality of arms 18 can be changed in accordance with the sizes of the mobile phase bottles placed on the base 16. While all of the arms 18 are provided to be slidable along the upper surface of the base 16 in this inventive example, the present invention is not limited to this. A position of part of the arms 18 may be fixed.

Further, as indicated by the broken lines in the diagram, the arms 18 are configured to be bendable so as not to interfere with placement of a mobile phase bottle onto the base 16.

Figure 2:
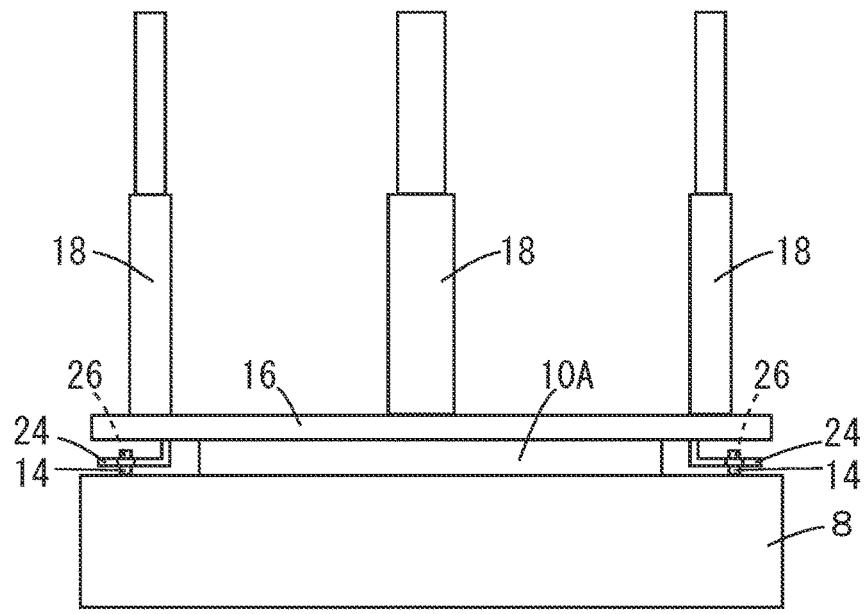
FIG. 2 A diagram of a weighing scale to which a detachment-attachment holder is attached as viewed in an X direction of FIG. 1.

As shown in FIG. 2, L-shape engaging portions 24 projecting downwardly are provided at the base 16 of the detachment-attachment holder 4. The engaging portions 24 are provided to correspond to the projections 14 provided on the casing 8 of the weighing scale 2 and respectively have through holes 26 through which the projections 14 can pass therein. When the detachment-attachment holder 4 is placed at the correct positions on the individual holders 10A and 10B of the weighing scale 2, the projections 14 of the casing 8 pass through the through holes 26 of the engaging portions 24. This prevents a positional shift of the detachment-attachment holder 4 with respect to the weighing scale 2. That is, the projections 14 and the engaging portions 24 constitute positional shift preventing mechanisms in which the projections 14 and the engaging portions 24 engage with each other when the detachment-attachment holder 4 is placed on the individual holders 10A and 10B, to prevent a positional shift of the detachment-attachment holder 4 with respect to the weighing scale 2.

While the three arms 18 are provided at the detachment-attachment holder 4 in this inventive example, four or more than four arms 18 may be provided, or no arm 18 may be provided.

The mobile phase monitor 6 is realized by a dedicated or general computer. In a case where this remaining mobile phase scale is used in a liquid chromatograph, the mobile phase monitor 6 can be implemented by a computer having a function of managing the operations of a liquid sending pump, an autosampler, a column oven and a detector that constitutes the liquid chromatograph and/or executing various calculation processes.

The mobile phase monitor 6 includes a mode switcher 28, a first calculator 30 and a second calculator 32. The mode switcher 28, the first calculator 30 and the second calculator 32 are functions implemented by execution of a predetermined program by a CPU (Central Processing Unit) in a computer that constitutes the mobile phase monitor 6.

A mobile phase monitor mode of the mobile phase monitor 6 has a normal mode and a large capacity mode. The normal mode is used when the detachment-attachment holder 4 is not attached to the weighing scale 2. In the normal mode, a remaining amount of a mobile phase in two mobile phase bottles respectively placed on the individual stages 10A and 10B is monitored. On the other hand, the large capacity mode is used when the detachment-attachment holder 4 is attached to the weighing scale 2. In the large capacity mode, the individual stages 10A and 10B are used as one common stage, and a remaining amount of a mobile phase in a large capacity mobile phase bottle placed on the common stage is monitored.

The mode switcher 28 is configured to switch the monitor mode between the normal mode and the large capacity mode. The monitor mode can be switched based on information input by a user. That is, whether the monitor mode is set to the normal mode or the large capacity mode may be arbitrarily selectable by the user.

Further, a sensor (a microsensor, for example) for detecting the detachment-attachment holder 4 attached to the weighing scale 2 can be provided in the weighing scale 2. In that case, the mode switcher 28 can be configured to switch the monitor mode to the normal mode when the detachment-attachment holder 4 is not detected by the sensor and switch the monitor mode to the large capacity mode when the detachment-attachment holder 4 is detected by the sensor.

Figure 3:
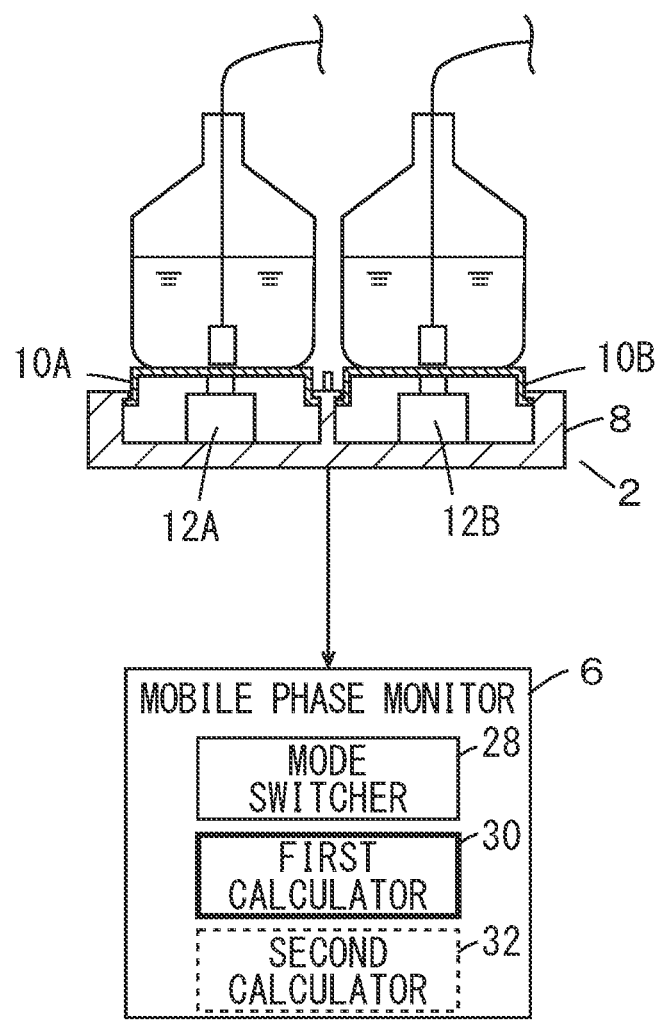
FIG. 3 A diagram showing the state when a monitor mode is set to a normal mode in the same inventive example.

As shown in FIG. 3, the first calculator 30 is a function enabled when the monitoring mode is in the normal mode. That is, when the monitor mode is the normal mode, the first calculator 30 is configured to obtain a remaining amount of a mobile phase in mobile phase bottles respectively placed on the individual stages 10A and 10B using measurement values provided by the respective individual weight sensors 12A and 12B.

Figure 4:
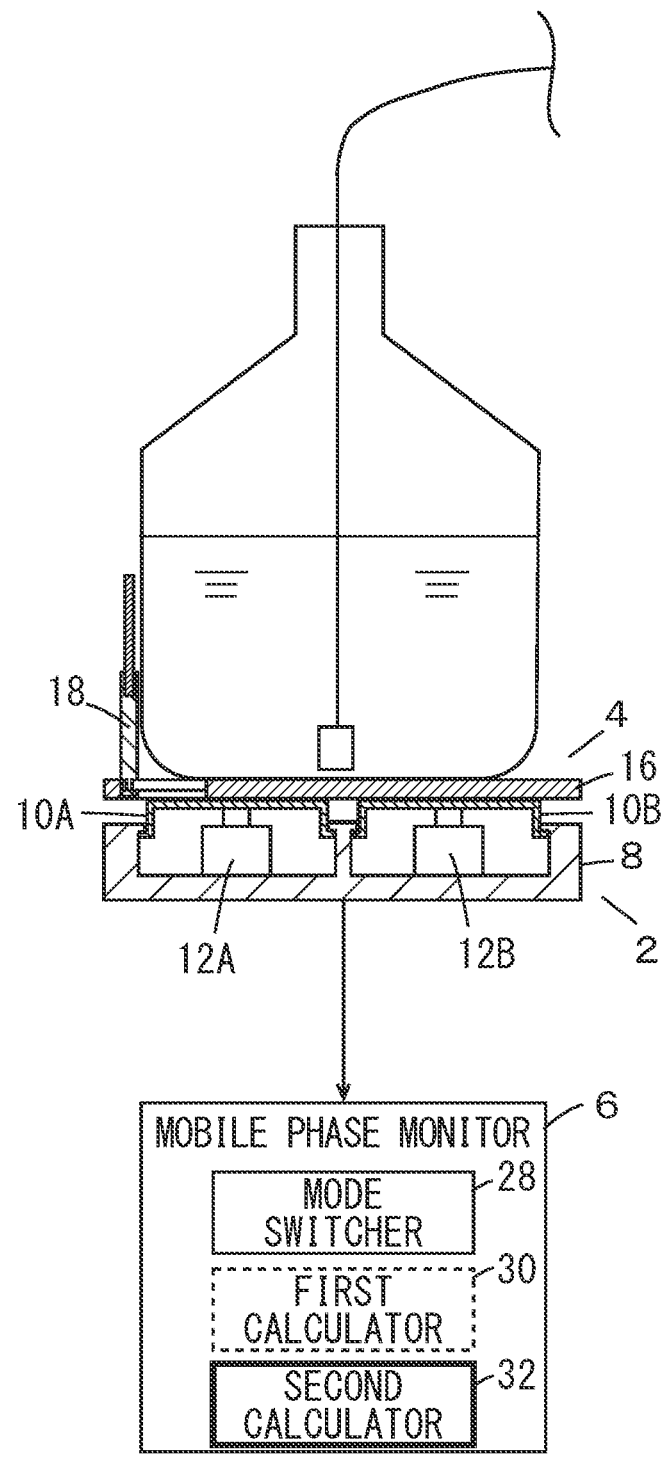
FIG. 4 A diagram showing the state when the monitor mode is set to a large capacity mode in the same inventive example.

As shown in FIG. 4, the second calculator 32 is a function enabled when the monitor mode is the large capacity mode. That is, when the monitor mode is the large capacity mode, the second calculator 32 is configured to obtain a remaining amount of a mobile phase in a mobile phase bottle placed on the detachment-attachment holder 4 (common stage) using an operation value of measurement values provided by the respective individual weight sensors 12A and 12B (a total value of the measurement values provided by the respective individual weight sensors 12A and 12B in the present inventive example).

As described above, in the large capacity mode, since one large capacity mobile phase bottle is supported by the plurality of individual weight sensors 12A and 12B, an applied load is distributed. This reduces a load applied to each of the individual weight sensors 12A and 12B. Thus, even in a case where a weight sensor having large load-resistant performance is not prepared separately, a remaining amount of a mobile phase in a large capacity mobile phase bottle that exceeds the load-resistant performance of one individual weight sensor can be monitored accurately.

While the weighing scale 2 has the two individual weight sensors 12A and 12B by way of example in the above-mentioned inventive example, the present invention is not limited to this. The present invention can be similarly applied a weighing scale having three or more than three individual weight sensors. In that case, a detachment-attachment holder and a second calculator can be configured such that a remaining amount of a mobile phase in a large capacity mobile phase bottle can be monitored with use of all or part of individual weight sensors provided in the weighing scale.

The above-described inventive example is merely one example of embodiments of the remaining mobile phase scale according to the present invention. The embodiments of the remaining mobile phase scale according to the present invention are as described below.

In an embodiment of a remaining mobile phase scale, the remaining mobile phase scale includes a weighing scale including a plurality of individual stages on which mobile phase bottles containing a mobile phase are placed and a plurality of individual weight sensors that respectively measure weight of mobile phase bottles respectively placed on the plurality of individual stages, a detachment-attachment holder detachably and attachably placed on the plurality of individual stages such that the plurality of individual stages are integrated as one common stage, and a mobile phase monitor that monitors a remaining amount of a mobile phase in mobile phase bottles based on measurement values of the plurality of individual weight sensors of the weighing scale, and the mobile phase monitor includes a mode switcher configured to selectively switch a mobile phase monitor mode to one of a normal mode and a large capacity mode, a first calculator configured to obtain a remaining amount of a mobile phase in mobile phase bottles respectively placed on the plurality of individual stages with use of respective measurement values of the plurality of individual weight sensors of the weighing scale, when the monitor mode is in the normal mode, and a second calculator configured to use the plurality of individual stages as the one common stage and obtain a remaining amount of a mobile phase in a mobile phase bottle placed on the common stage with use of an operation value of measurement values of the plurality of individual weight sensors of the weighing scale, when the monitor mode is in the large capacity mode.

In a first aspect of the above-mentioned embodiment of the remaining mobile phase scale according to the present invention, the second calculator is configured to obtain a remaining amount of a mobile phase in a mobile phase bottle placed on the common stage with use of a total value of measurement values of the plurality of individual weight sensors of the weighing scale, when the monitor mode is in the large capacity mode.

In a second aspect of the above-mentioned embodiment of the remaining mobile phase scale according to the present invention, the plurality of individual weight sensors have same load-resistant performance. With such an aspect, it is not necessary to provide a plurality of weight sensors having different load-resistant performance. Thus, an increase in cost is suppressed.

In a third aspect of the above-mentioned embodiment of the remaining mobile phase scale according to the present invention, the mode switcher is configured to switch the monitor mode to one of the normal mode and the large capacity mode based on information relating to the monitor mode input by a user. With such an aspect, the user can arbitrarily select and set the monitor mode.

In a fourth aspect of the above-mentioned embodiment of the remaining mobile phase scale according to the present invention, the weighing scale includes a sensor for detecting the detachment-attachment holder placed on the plurality of individual stages, and the mode switcher is configured to switch the monitor mode to the normal mode when the sensor is not detecting the detachment-attachment holder, and switch the monitor mode to the large capacity mode when the sensor is detecting the detachment-attachment holder. With such an aspect, the monitor mode of the mobile phase monitor is automatically switched to the large capacity mode only by attachment of the detachment-attachment holder to the weighing scale.

In a fifth aspect of the above-mentioned embodiment of the remaining mobile phase scale according to the present invention, the detachment-attachment holder includes a flat-plate shape base a bottom surface of which comes into contact with upper surfaces of the plurality of individual stages when the base is placed on the plurality of individual stages, and a plurality of arms that extend upwardly from the base to hold a mobile phase bottle placed on an upper surface of the base. With such an aspect, the mobile phase bottle placed on the upper surface of the detachment-attachment holder can be prevented from falling by the arms.

In the above-mentioned fifth aspect, at least part of the plurality of arms may be provided to be slidable along the upper surface of the base such that distances between the plurality of arms changes in accordance with a size of a mobile phase bottle placed on the upper surface of the base. If so, the detachment-attachment holder can correspond to mobile phase bottles of various sizes.

In the above-mentioned fifth aspect, at least part of the plurality of arms may be bendable. If so, the arm can be bent when a mobile phase bottle is placed on the base of the detachment-attachment holder. This facilitates placement of the mobile phase bottle on the detachment-attachment holder.

In the sixth aspect of the above-mentioned embodiments of the remaining mobile phase scale according to the present invention, positional shift preventing mechanisms, which prevent the detachment-attachment holder from moving in a horizontal direction relative to the weighing scale by being engaged with each other when the detachment-attachment holder is placed on the plurality of individual stages, are respectively provided at the weighing scale and the detachment-attachment holder. With such an aspect, a positional shift of the detachment-attachment holder with respect to the weighing scale is prevented, and a mobile phase bottle is prevented from falling from the weighing scale.

As a specific example of the above-mentioned sixth aspect, the positional shift preventing mechanisms include a hole provided in one of the weighing scale and the detachment-attachment holder and a projection provided in another one of the weighing scale and the detachment-attachment holder and inserted into the hole when the detachment-attachment holder is placed on the plurality of individual stages, by way of example.

The above-mentioned first to sixth aspects of the remaining mobile phase scale according to the present invention can be combined freely.

REFERENCE SIGNS LIST

2 Weighing scale
4 Detachment-attachment holder
6 Mobile phase monitor
8 Casing
10A, 10B Individual stages
12A, 12B Individual weight sensors
14 Projection
16 Base
18 Arm
20 Long hole
24 Engaging portion
26 Through hole
28 Mode switcher
30 First calculator
32 Second calculator

The invention claimed is:

1. A remaining mobile phase scale comprising:
a weighing scale including a plurality of individual stages on which mobile phase bottles containing a mobile phase are placed and a plurality of individual weight sensors that respectively measure weight of mobile phase bottles respectively placed on the plurality of individual stages;
a detachment-attachment holder detachably and attachably placed on the plurality of individual stages such that the plurality of individual stages are integrated as one common stage; and
a mobile phase monitor that monitors a remaining amount of a mobile phase in mobile phase bottles based on measurement values of the plurality of individual weight sensors of the weighing scale,
the mobile phase monitor comprising:
a mode switcher configured to selectively switch a mobile phase monitor mode to one of a normal mode and a large capacity mode;
a first calculator configured to obtain a remaining amount of a mobile phase in mobile phase bottles respectively placed on the plurality of individual stages with use of respective measurement values of the plurality of individual weight sensors of the weighing scale, when the monitor mode is in the normal mode; and
a second calculator configured to use the plurality of individual stages as the one common stage and obtain a remaining amount of a mobile phase in a mobile phase bottle placed on the common stage with use of an operation value of measurement values of the plurality of individual weight sensors of the weighing scale, when the monitor mode is in the large capacity mode.

2. The remaining mobile phase scale according to claim 1, wherein
the second calculator is configured to obtain a remaining amount of a mobile phase in a mobile phase bottle placed on the common stage with use of a total value of measurement values of the plurality of individual weight sensors of the weighing scale, when the monitor mode is in the large capacity mode.

3. The remaining mobile phase scale according to claim 1, wherein
the plurality of individual weight sensors have same load-resistant performance.

4. The remaining mobile phase scale according to claim 1, wherein
the mode switcher is configured to switch the monitor mode to one of the normal mode and the large capacity mode based on information relating to the monitor mode input by a user.

5. The remaining mobile phase scale according to claim 1, wherein
the weighing scale includes a sensor for detecting the detachment-attachment holder placed on the plurality of individual stages, and
the mode switcher is configured to switch the monitor mode to the normal mode when the sensor is not detecting the detachment-attachment holder, and switch the monitor mode to the large capacity mode when the sensor is detecting the detachment-attachment holder.

6. The remaining mobile phase scale according to claim 1, wherein
the detachment-attachment holder includes a flat-plate shape base a bottom surface of which comes into contact with upper surfaces of the plurality of individual stages when the base is placed on the plurality of individual stages, and a plurality of arms that extend upwardly from the base to hold a mobile phase bottle placed on an upper surface of the base.

7. The remaining mobile phase scale according to claim 6, wherein
at least part of the plurality of arms is provided to be slidable along the upper surface of the base such that distances between the plurality of arms changes in accordance with a size of a mobile phase bottle placed on the upper surface of the base.

8. The remaining mobile phase scale according to claim 6, wherein
at least part of the plurality of arms is bendable.

9. The remaining mobile phase scale according to claim 1, wherein
positional shift preventing mechanisms, which prevent the detachment-attachment holder from moving in a horizontal direction relative to the weighing scale by being engaged with each other when the detachment-attachment holder is placed on the plurality of individual stages, are respectively provided at the weighing scale and the detachment-attachment holder.

10. The remaining mobile phase scale according to claim 9, wherein the positional shift preventing mechanisms include a hole provided in one of the weighing scale and the detachment-attachment holder and a projection provided in another one of the weighing scale and the detachment-attachment holder and inserted into the hole when the detachment-attachment holder is placed on the plurality of individual stages.

\* \* \* \* \*